United States Patent

[11] 3,594,650

[72] Inventor Bengt Torkel Henoch
Alvsjo, Sweden
[21] Appl. No. 821,726
[22] Filed May 5, 1969
[45] Patented July 20, 1971
[73] Assignee Telefonaktiebolaget LM Ericsson
Stockholm, Sweden
[32] Priority May 10, 1968
[33] Sweden
[31] 6328/1968

[54] BAND SELECTION FILTER WITH TWO ACTIVE ELEMENTS
9 Claims, 19 Drawing Figs.

[52] U.S. Cl. .......... 328/167, 307/233, 307/295, 307/322, 307/324, 328/241, 333/80 R
[51] Int. Cl. .......... H03f 1/00
[50] Field of Search .......... 333/80, 80 T; 307/233, 295; 328/140, 165, 167; 330/107, 109

[56] References Cited
UNITED STATES PATENTS

| | | | |
|---|---|---|---|
| 2,788,496 | 4/1957 | Linvill | 333/80 |
| 3,120,645 | 2/1964 | Sipress et al. | 333/80 UX |
| 3,141,138 | 7/1964 | Oshima et al. | 333/80 X |

*Primary Examiner*—Herman Karl Saalbach
*Assistant Examiner*—Paul L. Gensler
*Attorney*—Hane & Baxley

ABSTRACT: The invention relates to active band-selection filters with a band-selection transfer function of the second order. The filter contains resistances and lossy resonant circuits. A significant feature for filter circuits constructed in accordance with the invention is that they contain two active elements connected in such a way that the denominator of the transfer function has certain well-defined symmetry properties related to the circuit parameters of the two active elements and to the passive elements. In filters with these symmetry properties changes in the transfer function caused by variations in the active and passive filter elements are minimized and the manufacture of band-selection filter is simplified.

INVENTOR
BENGT TORKEL HENOCH
BY Hane and Baxley
ATTORNEYS

INVENTOR
BENGT TORKEL HENOCH

BY Hane and Baxley
ATTORNEYS

INVENTOR

Bengt Torkel Henoch

BY Hane and Baxley

ATTORNEYS

INVENTOR
Bengt Torkel Henoch

BY Hane and Baxley
ATTORNEYS

INVENTOR
BENGT TORKEL HENOCH
BY Hane and Baxley
ATTORNEYS

INVENTOR
BENGT TORKEL HENOCH

BY Hane and Baxley
ATTORNEYS

INVENTOR
BENGT TORKEL HENOCH

BY Hane + Baxley

ATTORNEYS

BAND SELECTION FILTER WITH TWO ACTIVE ELEMENTS

BAND SELECTION FILTER WITH TWO ACTIVE ELEMENTS

This invention relates to band selection filters and more particularly to filters composed of an impedance network which claims. two active elements and two types of impedance elements, i.e. lossy resonant circuits which have a resonance at the center frequency $f_o$ of the filter and resistances, and which are interconnected in such a way as to realize a transfer function whose denominator is a second order polynomial when expressed as a function of the terms given by the impedances of the resonant circuits.

An object of the invention is to provide a band selection filter which minimizes changes in the transfer function caused by variations in passive and active elements.

Band selection filters built in accordance with embodiments of the invention have characteristics which are defined by the claims.

The nature of the invention and its various objects, features and advantages will appear more fully in the following detailed description of preferred embodiments illustrated in the accompanying drawings of which:

Figure 1:
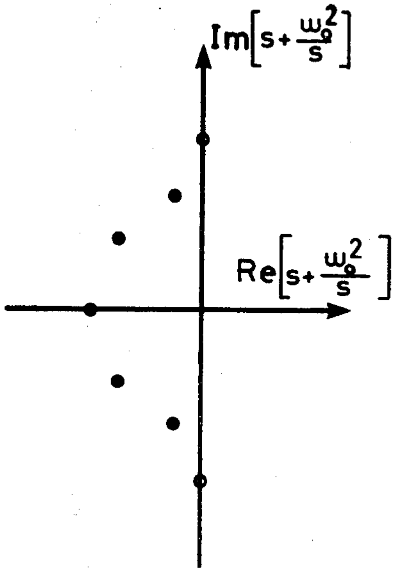
FIGS. 1 and 2 are pole-zero diagrams.

In electronics it is of great technological interest to be able to manufacture electronic circuits as compactly as possible, partly to get as small a volume as possible, and partly to get more economic methods of manufacture, higher reliability and better control of different circuit functions. For this reason integrated techniques and other techniques have significant use in the manufacture of miniaturized circuits. An important problem is the difficulty, that is connected with the construction of band-selection filters with narrow frequency response, that is high-Q filter circuits. There are several reasons for this. First, integrated techniques are best suited for manufacture of resistors, capacitors, transistors and diodes. Secondly, with integrated techniques or equivalent techniques there are no methods for manufacturing miniaturized high-Q inductances which are necessary for sharp passive band-selection filters. As a consequence two methods have been used, active RC-filters of low-pass type, and passive LC-filters, containing resonant circuits with sufficiently high Q-values. Both of these methods have serious limitations. Active RC-filters have serious stability limitations when used to realize a band-selection filter with a narrow frequency response. Passive LC-filters are limited by the Q that can be obtained in miniaturized resonant circuits. The invention concerns band-selection filters composed of resonant circuits with low Q-values and active elements constructed in such a way as to achieve narrow frequency response. In addition, the resistive losses in these resonant circuits can be compensated by the active elements in such a way that the stability of the circuit will be greater than for previous filters.

The invention is described in terms of the filter transfer function denoted by H and defined as either the ratio between output voltage $E_2$ of the filter and the input voltage $E_1$ when the input source impedance is zero and the load impedance is infinity or the ratio between the output current $I_2$ to the filter and input current $I_1$ when the input source impedance is infinity and the load impedance is zero. This implies that the actual source and load impedances either are included as part of the filter or satisfy the definitions. The transfer function H can be represented by a ratio of polynomials.

For band-selection filters with a transfer function H having a center frequency $f_o$, i.e. band-pass and bandstop filters, the numerator and denominator of the transfer function can be expressed by polynomials of the term $s+\omega_o^2/s$ or of another term, which is a function of frequency and becomes zero when $s=\pm j\omega_o$, where $\omega_o=2\pi f_o$, and $s$ is the complex angular frequency variable. The transfer function is characterized by roots of the polynomials which compose the numerator and denominator. That is zeros of the transfer function, $n_k$, correspond to roots of the polynomial in the numerator and poles of the transfer function, $p_k$, correspond to roots of the polynomial in the denominator. The transfer function H of the band selection filter can then be written $$H=\frac{\prod_{k=0}^{M}\left(s+\frac{\omega_0^2}{s}-n_k\right)}{\prod_{k=0}^{N}\left(s+\frac{\omega_0^2}{s}=P_k\right)}$$

Impedance networks composed of lossless resonant circuits can realize any transfer function. However, resonant circuits with losses will give rise to limitations which can only be eliminated with the help of active elements. In order to explain these limitations an impedance network is chosen, which can contain series resonant circuits with an inductance $L_k$ in series with a capacitance $C=1/\omega_o^2L_k$ which gives resonance at the frequency $f_o$ and losses represented by a series resistance $r=\omega_oL_k/Q_o$ which gives all the resonant circuits the same $Q$-value, $Q_o$. Further the impedance network can contain a parallel resonant circuit with a capacitance $C_K$ in parallel with an inductance $L=1/\omega_o^2C_k$ which gives resonance at the frequency $f_o$ and losses represented by a parallel conductance $g=\omega_oC_k/Q_o$ which gives all the resonant circuits the same $Q$-value, $Q_o$. The impedance network can also contain resistances. The impedance, $Z_k$, of the series resonant circuits can be written $$Z_k=\left(s+\frac{\omega_0^2}{s}+\frac{\omega_0}{Q_0}\right)L_k$$

and the admittance, $Y_k$, of the parallel resonant circuits can be written $$Y_k=\left(s+\frac{\omega_0^2}{s}+\frac{\omega_0}{Q_0}\right)C_k$$

For a general impedance network the transfer function is completely determined by polynomials of terms which are products of an impedance and an admittance contained in the network. For an impedance network composed of resistors and elements $Z_k$ and $Y_k$ the transfer function will thus be completely determined by polynomials of the term:

$$\gamma = s + \frac{\omega^2_0}{s} + \frac{\omega}{Q}$$

A desired transfer function $H$ given in polynomials of $s+\omega^2_o/s$ can also be expressed in terms as follows:

$$H = \frac{\prod_{k=0}^{M}\left(s+\frac{\omega^2_0}{s}-n_k\right)}{\prod_{k=0}^{N}\left(s+\frac{\omega^2_0}{s}-P_k\right)} = \frac{\prod_{k=0}^{M}\left[\gamma-\left(n_k+\frac{\omega_0}{Q_0}\right)\right]}{\prod_{k=0}^{N}\left[\gamma-\left(P_k+\frac{\omega_0}{Q_0}\right)\right]}$$

Figure 2:
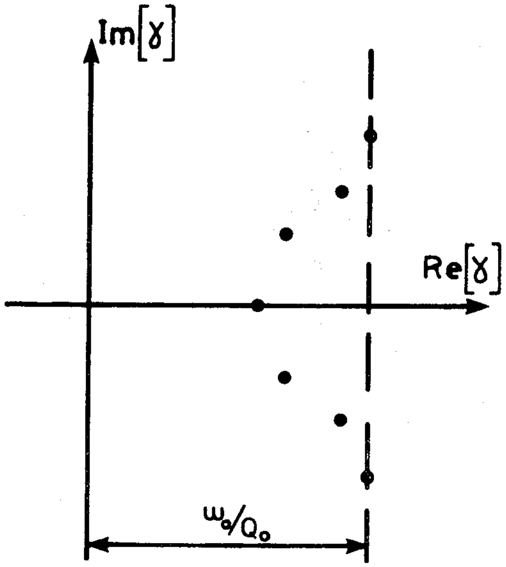

The transfer function can thus be described with poles and zeros in the complex $(s+\omega^2_o/s)$-plane as well as in the complex $\gamma$-plane. Since the $\gamma$ and $s+\omega^2_o/s$ differ by $\omega_o/Q$, the poles and zeros in the complex $\gamma$-plane are translated with a constant distance $\omega_o/Q_o$ along the positive real axis relative to their location in the complex $(s+\omega^2_o/s)$-plane as shown in FIGS. 1 and 2. For stability the poles in the $\gamma$-plane must be to the left of the line $\gamma=\omega_o/Q_o$. A passive impedance chain containing resonance circuits with the Q-value $Q_o$, can thus only give transfer functions with poles in the left half $\gamma$-plane. If active elements are included in the chain, poles can also be located just to the left of the line, $\gamma=\omega_o/Q_o$. The function of the active elements can be said to be to translate the poles a uniform distance $\omega_o/Q_o$. Use of active elements gives filters which are potentially unstable and variations in active and passive elements caused by temperature drift, aging or carelessness when selecting or trimming elements can give instability or disturbances in the transfer function of the filter. The probability for instability is decreased for smaller translations $\omega_o/Q_o$. It can be shown that for an active RC band-selection filter it is necessary to translate a pole at least the distance $2\omega_o$. It follows that when resonant circuits with a very low Q-value, but not smaller than ½ are used, the probability of instability is substantially decreased and it is possible to construct miniaturized resonant circuits with low Q-value which are stable.

The probability for instability is also influenced to a great extent by the number of poles that are associated with each active element, and in principle the probability of instability decreases when there are fewer poles associated with each active element. A common method which is used to achieve the best stability, especially in band selection filters realized as active RC-filters, is to translate the poles in a transfer function from the $(s+\omega^2_o/s)$-plane to the $s$-plane and then to construct a pole-pair in the $s$-plane, which corresponds to one pole in the $(s+\omega^2_o/s)$-plane by using an isolated stage containing one active element. When using this method, a complete band-selection filter consists of several such cascaded and isolated stages of the low-pass type.

This invention concerns filter circuits for realizing a transfer function containing a conjugate pole-pair in the complex $(s+\omega^2_o/s$-plane. Filter circuits are constructed, according to the invention, from resonant circuits with losses and resistances, and in addition to this, from two active elements connected in such a way as to obtain substantially better stability than for previously used filters. In addition, to improve stability it is possible to use resonant circuits which are easier to manufacture for high frequencies than the pure inductances and capacitances which are required in circuits of the low-pass type.

In order to describe the construction of the filter circuits according to the invention, a transfer function for a filter circuit is given which contains a pole-pair $\omega_b\ (-\sigma\pm j\delta)$ where $\omega_b=2\pi f_b$ and $f_b$ is the bandwidth of the filter circuit. Resonant circuits contained in the filter circuit are assumed to have the same Q-value, $Q_o$, and the pole pair can be translated to the $\gamma$-plane through a translation $\omega_o/Q_o$. If the Q-value for the filter circuit $Q_b=\omega_o/\omega_b$ and $\gamma$ is normalized with respect to $\omega_b$, the pole-pair in the $\gamma$-plane can be written $$\frac{Q_b}{Q_0} - \sigma \pm \delta$$

The transfer function of the filter circuit expressed in $\gamma$ can then be written $$H \sim \frac{1}{\gamma^2 - 2\frac{Q_b}{Q_0}\left(1-\sigma\frac{Q_0}{Q_b}\right)\gamma + \frac{Q^2_b}{Q^2_0}\left[1-2\sigma\frac{Q_0}{Q_b}+\frac{Q^2_0}{Q^2_b}(\sigma^2+\delta^2)\right]}$$

In order to express the transfer function of the filter circuit in circuit parameters and $\gamma$, the circuit parameters of the active elements are used and the series resonant circuits are written as impedances $\gamma L$ and parallel resonant circuits as admittances $\gamma C$. The transfer function can then be written with characteristic coefficients for the filter circuit.

$$H \sim \frac{1}{\gamma^2 - [A+B-C]\gamma + [A\cdot B+D]}$$

For a filter circuit constructed according to the invention, the coefficient for $\gamma$ in the denominator of the transfer function is composed of the sum of two coefficients $A$ and $B$ which are nearly equal and a correction term $C$. The magnitude of the coefficient $A$ is determined by two or more of the passive elements contained in the circuit and one of the two active elements contained in the circuit. The other coefficient $B$ is determined by two or more of the passive elements contained in the circuit which are not the same elements as for the coefficient $A$ and the other active element. The constant term in the denominator of the transfer function is composed of the product of the two coefficients $A$ and $B$ and a small correction term $D$. The active elements mentioned above can be any of the well-known controlled currents or voltage sources, negative impedance converters or negative impedance inverters which can be constructed as impedance networks containing transistors for realizing particular circuit functions. A complete band-selection filter is then constructed from several cascaded filter circuits and active elements isolated from each other by emitter followers.

An important advantage for filter circuits constructed according to the invention is that the transfer function of the filter circuit has a smaller sensitivity to variations in the passive and active elements than is the case for previous filters. The sensitivity is given as the relative change in the passive and active elements which translates the poles $1/10\ \sigma$ in the $\gamma$-plane. For filter circuits constructed according to the invention this relative change is $$\frac{1}{10}\,\frac{2\sigma Q_0}{Q_b}$$

For filter circuits constructed from cascaded low-pass circuits the corresponding relative change is $$\frac{1}{10}\,\frac{\sigma Q_0}{Q_b}$$

Since the elements must be changed twice as much for the circuit according to the invention in order to obtain the same translation of the poles it is clear that the sensitivity has been improved by a factor of two.

Following are some examples illustrating the construction of filter circuits according to the invention which incorporate different types of active elements. The filter circuits each have a transfer function with a pole-pair $\omega_b\ (-\sigma\pm j\delta)$ and for simplicity it is assumed that the resonant circuits contained in the filter circuits have the same Q-value, $Q_o$.

The magnitude of the circuit parameters contained in the filter circuits are given with the help of the earlier defined parameters. For a series circuit only the inductance is given and the additional elements are obtained from the resonant frequency $f_o$ of the series circuit and the Q-value, $Q_o$. For parallel circuits only the capacitance is given and the additional elements are obtained from the resonant frequency $f_o$ of the parallel circuit and the Q-value, $Q_o$.

Figure 3:
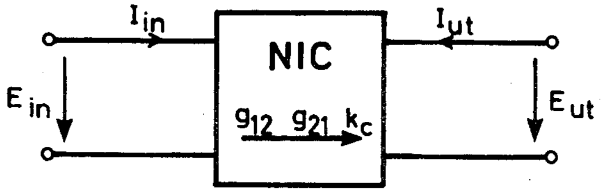
FIG. 3 is a block diagram illustrating a negative impedance converter.

First consider filter circuits containing two negative impedance converters. It is important how these active elements are connected. FIG. 3 illustrates the convention for circuit parameters and polarities for a negative impedance converter. The currents and voltages are given by $$\begin{cases} I_{in}=g_{12}I_{ut} \\ E_{ut}=g_{21}E_{in} \end{cases} \quad k_c=g_{12}\cdot g_{21}$$

When connecting a negative impedance converter, some stability properties should be considered which are related to the way in which the impedance becomes passive outside the frequency range of the converter. For a converter as illustrated in FIG. 3, the output is stable against open circuits, which means that the negative impedance at the output has a zero in the right half of the $s$-plane, and the input is stable against short circuits which means that the negative admittance at the input has a zero in the right half of the $s$-plane. These stability properties are considered in the following circuits.

In FIGS. 4, 5, 6 and 7 four filter circuits are shown containing two negative impedance converters.

Figure 4:
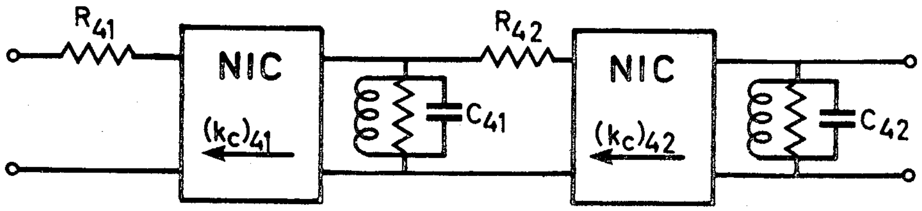
FIG. 4, 5, 6 and 7 are schematic circuits of band-selection filters containing two negative impedance converters in accordance with the invention.

For the filter circuit illustrated by FIG. 4, the magnitude of the components is the following;

$$\frac{(k_c)_{41}}{\omega_b R_{41}C_{41}}=\frac{Q_b}{Q_o}\sqrt{1-2\sigma\frac{Q_o}{Q_b}+\frac{Q_o^2}{Q_b^2}(\sigma^2+\delta^2)}=A$$

$$\frac{(k_c)_{42}}{\omega_b R_{42}C_{42}}=\frac{Q_b}{Q_o}\sqrt{1-2\sigma\frac{Q_o}{Q_b}+\frac{Q_o^2}{Q_b^2}(\sigma^2+\delta^2)}=B$$

$$\frac{1}{\omega_b R_{42}C_{41}}=2\frac{Q_b}{Q_o}\left[\sqrt{1-2\sigma\frac{Q_o}{Q_b}+\frac{Q_o^2}{Q_b^2}(\sigma^2+\delta^2)}-\left(1-\sigma\frac{Q_o}{Q_b}\right)\right]=C$$

$$D=0$$

Figure 5:
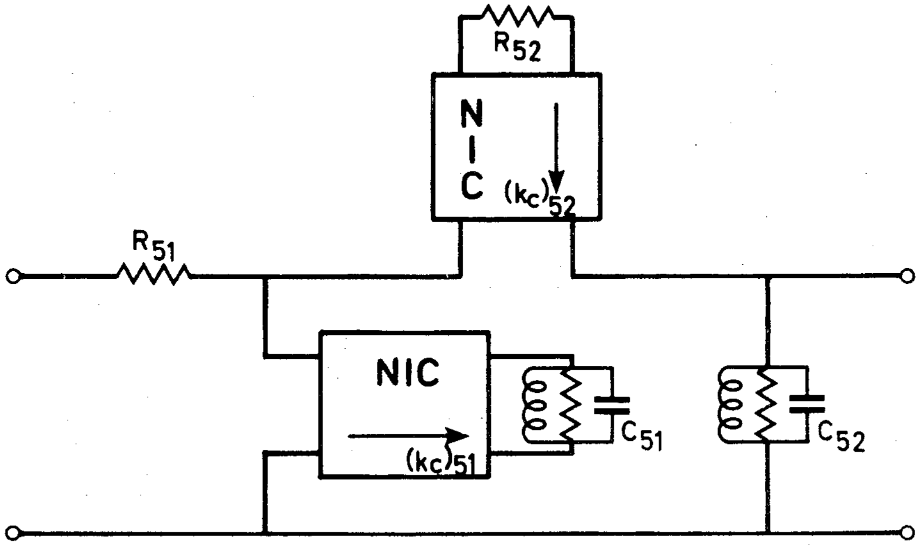
Figure 6:
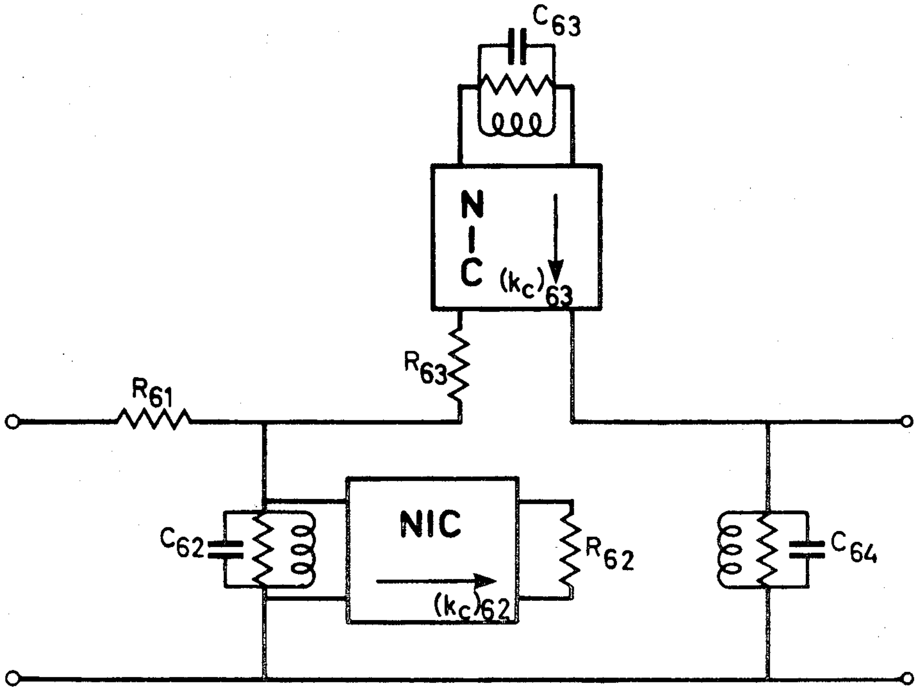

For the filter circuits illustrated by FIGS. 5 and 6 the magnitude of the coefficients $A$, $B$, $C$ and $D$ are the same as for the filter circuit of FIG. 4. For filter circuit illustrated by FIG. 5, the magnitude for the coefficients is the following;

$$\frac{1}{(k_c)_{51}}\frac{1}{\omega_b R_{51}C_{51}}=A;\quad \frac{1}{(k_c)_{52}}\frac{1}{\omega_b R_{52}C_{52}}=B$$

$$\frac{1}{(k_c)_{51}(k_c)_{52}}\frac{1}{\omega_b R_{52}C_{51}}=C$$

For the filter circuit shown in FIG. 6, the magnitude of the coefficients is the following;

$$\frac{\frac{C_{64}}{C_{63}}(k_c)_{63}-1}{\omega_b R_{63}C_{64}}=A;\quad \frac{\frac{R_{61}}{R_{62}}(k_c)_{62}-1}{\omega_b R_{61}C_{62}}=B;$$

$$\frac{\left[\frac{C_{64}}{C_{63}}(k_c)_{63}-1\right]\left[\frac{R_{61}}{R_{62}}(k_c)_{62}-1\right]}{\omega_b R_{63}C_{62}}=C$$

Figure 7:
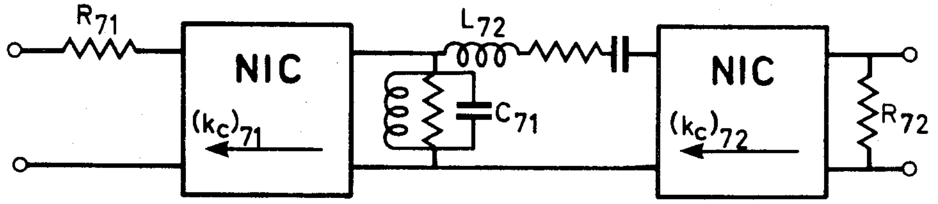

For the filter circuit of FIG. 7 the magnitude of the coefficients is the following;

$$(k_c)_{71}\frac{1}{\omega_b R_{71}C_{71}}=\frac{Q_b}{Q_o}\left(1-\sigma\frac{Q_o}{Q_b}\right)=A$$

$$(k_c)_{72}\frac{R_{72}}{\omega_b L_{72}}=\frac{Q_b}{Q_o}\left(1-\sigma\frac{Q_o}{Q_b}\right)=B$$

$$\frac{1}{\omega_b^2 L_{72}C_{71}}=\sigma^2=D$$

$$C=0$$

FIGS. 8, 9, 10 and 11 illustrate four different filter circuits incorporating two voltage-controlled voltage sources. A voltage controlled voltage source corresponds to an amplifier with an infinite input-impedance, zero output-impedance and a voltage gain $\beta$. For these voltage sources it is assumed that the feedback between output and input is stable against open circuits.

Figure 8:
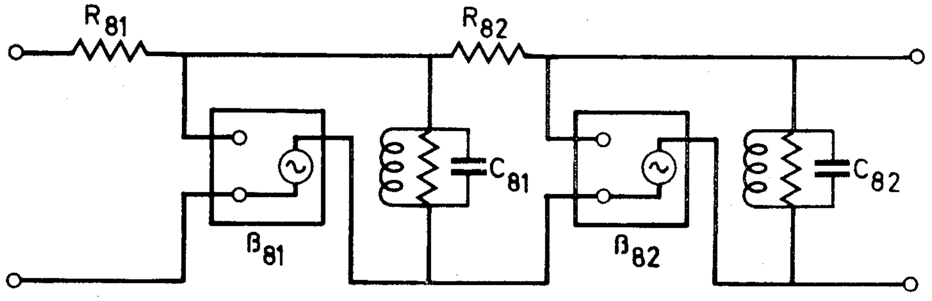
FIGS. 8, 9, 10 and 11 are schematic circuits of band-selection filters containing two voltage-controlled voltage sources in accordance with the invention.

For filter circuit illustrated by FIG. 8, the magnitude of the coefficients is the following;

$$\frac{1}{\beta_{81}-1}\frac{1}{\omega_b R_{81}C_{81}}=\frac{Q_b}{Q_o}\sqrt{1-2\sigma\frac{Q_o}{Q_b}+\frac{Q_o^2}{Q_b^2}(\sigma^2+\delta^2)}=A$$

$$\frac{1}{\beta_{82}-1}\frac{1}{\omega_b R_{82}C_{82}}=\frac{Q_b}{Q_o}\sqrt{1-2\sigma\frac{Q_o}{Q_b}+\frac{Q_o^2}{Q_b^2}(\sigma^2+\delta^2)}=B$$

$$\frac{1}{\omega_b R_{82}C_{81}}=2\frac{Q_b}{Q_o}\left[\sqrt{1-2\sigma\frac{Q_o}{Q_b}+\frac{Q_o^2}{Q_b^2}(\sigma^2+\delta^2)}-\left(1-\sigma\frac{Q_o}{Q_b}\right)\right]=C$$

$$D=0$$

Figure 9:
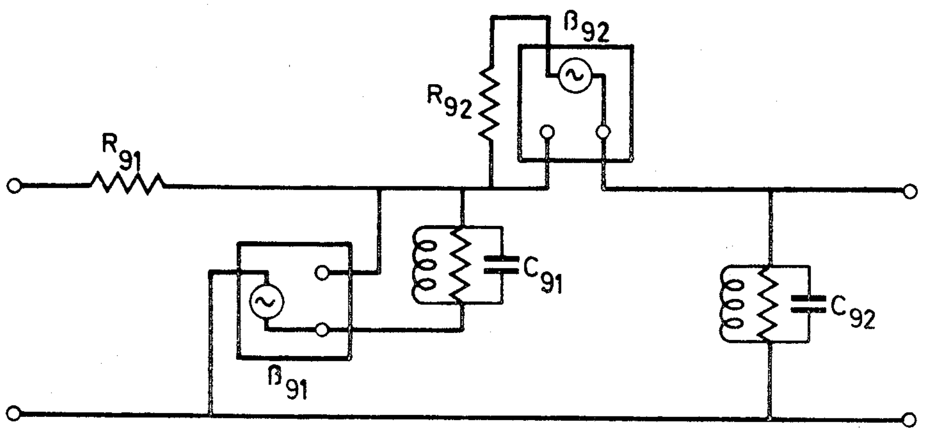
Figure 10:
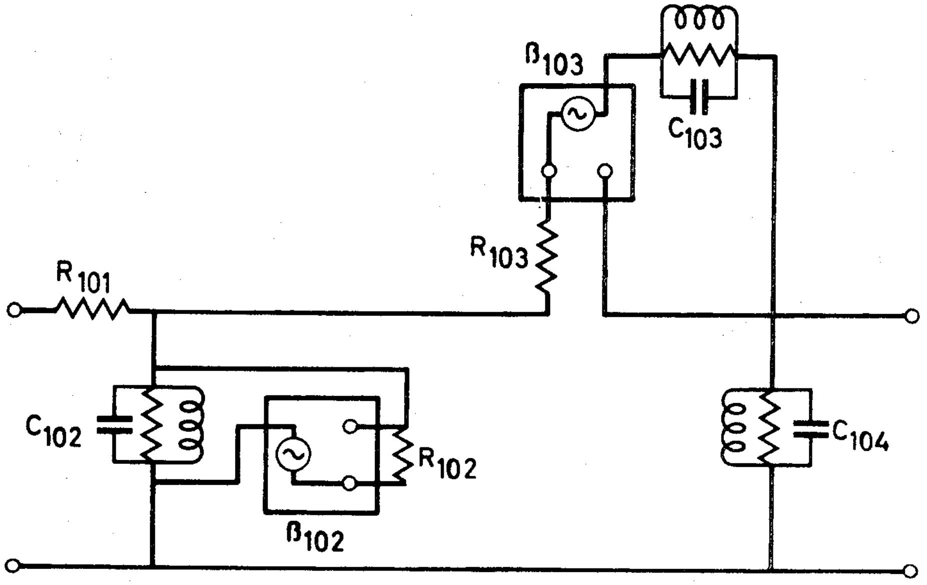

For the filter circuits of FIGS. 9 and 10, the magnitude of the coefficients $A$, $B$, $C$ and $D$ are the same as for the filter circuit of FIG. 8.

For the filter circuit of FIG. 9, the magnitude of the coefficients is the following;

$$\frac{\beta_{91}-1}{\omega_b\cdot R_{91}\cdot C_{91}}=A;\quad \frac{\beta_{92}-1}{\omega_b\cdot R_{92}\cdot C_{92}}=B;\quad \frac{(\beta_{91}-1)(\beta_{92}-1)}{\omega_b\cdot R_{92}\cdot C_{91}}=C$$

For the filter circuit shown in FIG. 10, the magnitude of the coefficients is the following;

$$\frac{\frac{R_{101}}{R_{102}}\frac{1}{\beta_{102}-1}-1}{\omega_b\cdot R_{101}\cdot C_{102}}=A;\quad \frac{\frac{C_{104}}{C_{103}}\frac{1}{\beta_{103}-1}-1}{\omega_b\cdot R_{103}\cdot C_{104}}=B;$$

$$\frac{\left[\frac{R_{101}}{R_{102}}\cdot\frac{1}{\beta_{102}-1}-1\right]\cdot\left[\frac{C_{104}}{C_{103}}\frac{1}{\beta_{103}-1}-1\right]}{\omega_b\cdot R_{103}\cdot C_{102}}=C$$

Figure 11:
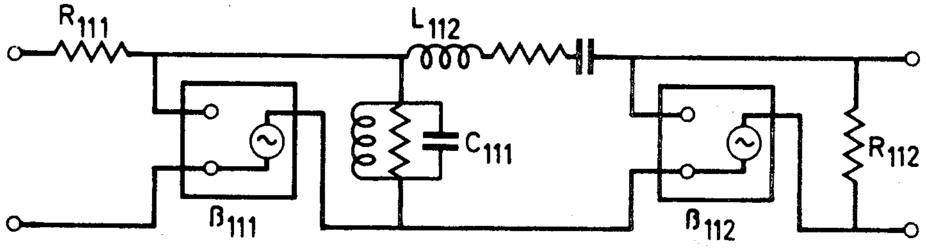

For the filter circuit illustrated by FIG. 11, the magnitude of the coefficients is the following;

$$\frac{1}{\beta_{111}-1}\frac{1}{\omega_b R_{111}C_{111}}=\frac{Q_b}{Q_o}\left(1-\sigma\frac{Q_o}{Q_b}\right)=A$$

$$\frac{1}{\beta_{112}-1}\frac{R_{112}}{\omega_b L_{112}}=\frac{Q_b}{Q_o}\left(1-\sigma\frac{Q_o}{Q_b}\right)=B$$

$$\frac{1}{\omega_b^2 L_{112}C_{111}}=\delta^2=D$$

$$C=0$$

Figure 12:
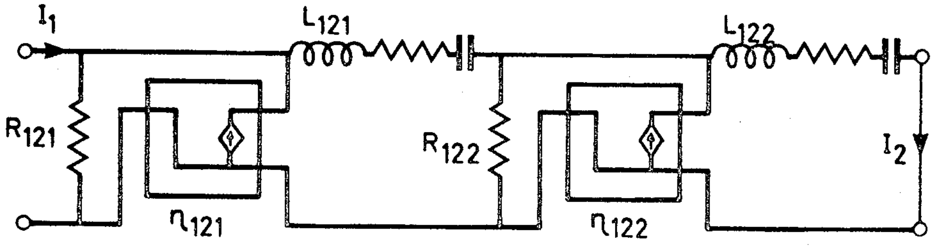
FIGS. 12, 13 and 14 are schematic circuits of band-selection filters containing two current-controlled current sources in accordance with the invention.
Figure 13:
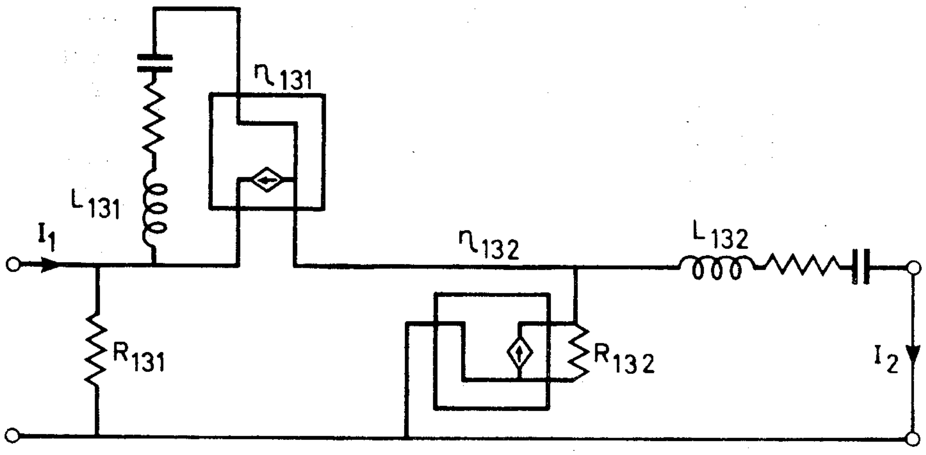
Figure 14:
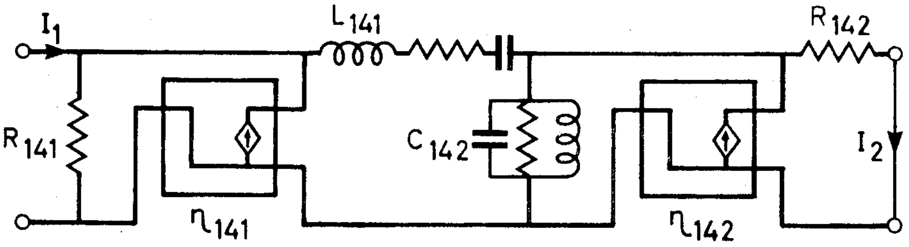

FIGS. 12, 13 and 14 show three different filter circuits which contain two current-controlled current sources. A current-controlled current source corresponds to an amplifier with the input-impedance zero, the output-impedance infinite and a current gain $\eta$. For these current sources it is assumed that the feedback between the output and input is stable against open circuits.

For the filter circuit illustrated by FIG. 12, the magnitude of the coefficients is;

$$\frac{1}{\eta_{121}-1}\frac{R_{121}}{\omega_b L_{121}}=\frac{Q_b}{Q_o}\sqrt{1-2\sigma\frac{Q_o}{Q_b}+\frac{Q_o^2}{Q_b^2}(\sigma^2+\delta^2)}=A$$

$$\frac{1}{\eta_{122}-1}\frac{R_{122}}{\omega_b L_{122}}=\frac{Q_b}{Q_o}\sqrt{1-2\sigma\frac{Q_o}{Q_b}+\frac{Q_o^2}{Q_b^2}(\sigma^2+\delta^2)}=B$$

$$\frac{R_{122}}{\omega_b L_{121}}=2\frac{Q_b}{Q_o}\left[\sqrt{1-2\sigma\frac{Q_o}{Q_b}+\frac{Q_o^2}{Q_b^2}(\sigma^2+\delta^2)}-\left(1-\sigma\frac{Q_o}{Q_b}\right)\right]=C$$

$$D=0$$

For the filter circuit of FIG. 13, the magnitude of the coefficients $A$, $B$, $C$ and $D$ are the same as for the filter circuit of FIG. 12. The magnitude of the coefficients for the filter circuit of FIG. 13 will be;

$$(\eta_{131}-1)\frac{R_{131}}{\omega_b L_{131}}=A;\quad (\eta_{132}-1)\frac{R_{132}}{\omega_b L_{132}}=B;$$

$$(\eta_{131}-1)(\eta_{132}-1)\frac{R_{132}}{\omega_b L_{131}}=C$$

For the filter circuit shown in FIG. 14, the magnitude of the coefficients is;

$$\frac{1}{\eta_{141}-1}\frac{R_{141}}{\omega_b L_{141}}=\frac{Q_b}{Q_o}\left(1-\sigma\frac{Q_o}{Q_b}\right)=A$$

$$\frac{1}{\eta_{142}-1}\frac{1}{\omega_b R_{142} C_{142}}=\frac{Q_b}{Q_o}\left(1-\sigma\frac{Q_o}{Q_b}=B\right.$$

$$\frac{1}{\omega_b^2 L_{141} C_{142}}=\delta^2=D$$

$$C=0$$

In the examples shown up to now of filter circuits constructed according to the invention, the transfer function has contained a pole-pair $\omega_b(-\sigma\pm j\delta)$ in the $(s+\omega^2_o/s)$-plane. It is also possible, without altering any significant features, to modify the circuit construction of these filter circuits so that the transfer function in addition to this pole-pair also contains one or two zeros in the $(s+\omega^2_o/s)$-plane. This modification means in principal that voltages and currents proportional to the input voltage of the filter circuit or the input current are fed back to the impedance elements of the filter circuit. In the following some examples for filter circuits with this modification are shown.

As a first example a transfer function containing a pole-pair $\omega_b(-\sigma\pm j\delta)$ and two zeros $\pm j\omega_b n_1$ on the imaginary axis in the $(s+\omega^2_o/s)$-plane is illustrated. After a translation of poles and zeros by the distance $\omega_o/Q_o$ the transfer function can be expressed in $\gamma$, where $\gamma$ is normalized with respect to $\omega_b$ as $$H\sim\frac{\gamma^2-2\frac{Q_b}{Q_0}\gamma+\frac{Q_b^2}{Q_0^2}\left(1+\frac{Q_0^2}{Q_b^2}n_1^2\right)}{\gamma^2-2\frac{Q_b}{Q_0}\left(1-\sigma\frac{Q_0}{Q_b}\right)\gamma+\frac{Q_b^2}{Q_0^2}\left[1-2\sigma\frac{Q_0}{Q_b}+\frac{Q_0^2}{Q_b^2}(\sigma^2+\delta^2)\right]}$$

Figure 15:
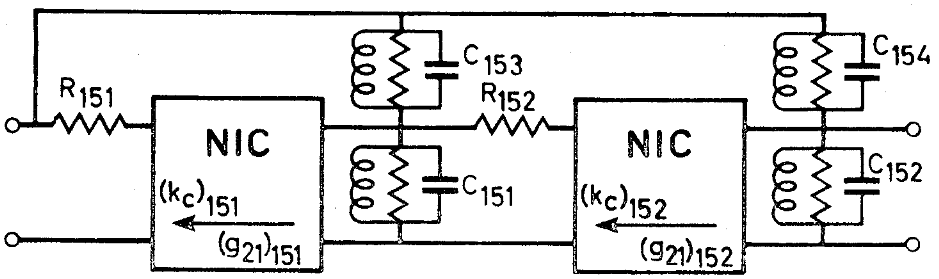
FIG. 15 is a schematic circuit of a band-selection filter, in accordance with the invention, whose transfer function contains two imaginary zeros.

Such a transfer function can be realized for example if the filter circuit shown in FIG. 4 is modified so that two of the shunt-elements shown are divided in half, so that two divided shunt elements are connected with the input of the filter circuit as in FIG. 15.

The transfer function of the filter circuit shown in FIG. 15 can then be written as;

$$H\sim\frac{\gamma^2-E\cdot\gamma+F}{\gamma^2-[A+B-C]\gamma+AB}$$

where $$E=A\frac{1}{(g_{21})_{152}}\frac{C_{153}(C_{152}+C_{151})}{(C_{151}+C_{153})C_{151}}+B-C$$

and $$F=\frac{A\cdot B}{(g_{21})_{151}(g_{21})_{152}}\frac{C_{152}+C_{154}}{C_{154}}$$

For the filter circuit the coefficients are given by;

$$\frac{(k_c)_{151}}{\omega_b R_{151}(C_{151}+C_{153})}=\frac{Q_b}{Q_0}\sqrt{1-2\sigma\frac{Q_0}{Q_b}+\frac{Q_0^2}{Q_{b2}}(\sigma^2+\delta^2)}=A$$

$$\frac{(k_c)_{152}}{\omega_b R_{152}(C_{152}+C_{154})}=\frac{Q_b}{Q_0}\sqrt{1-2\sigma\frac{Q_0}{Q_b}+\frac{Q_0^2}{Q_b^2}(\sigma^2+\delta^2)}=B$$

$$\frac{1}{\omega_b R_{152}(C_{151}+C_{153})}$$

$$=2\frac{Q_b}{Q_0}\left[\sqrt{1-2\sigma\frac{Q_0}{Q_b}+\frac{Q_0^2}{Q_b^2}(\sigma^2+\delta^2)}-\left(1-\sigma\frac{Q_0}{Q_b}\right)\right]=C$$

$$D=0$$

and for the two zeros;

$$\frac{1}{(g_{21})_{152}}\cdot\frac{C_{153}(C_{152}+C_{154})}{(C_{151}+C_{153})C_{154}}=1+\frac{2\sigma}{\frac{Q_b}{Q_0}\sqrt{1-2\sigma\frac{Q_0}{Q_b}+\frac{Q_0^2}{Q_b^2}(\sigma^2+\delta^2)}}$$

$$\frac{1}{(g_{21})_{151}(g_{21})_{152}}\cdot\frac{C_{152}+C_{154}}{C_{154}}=\frac{1+\frac{Q_0^2}{Q_b^2}n_1^2}{1-2\sigma\frac{Q_0}{Q_b}+\frac{Q_0^2}{Q_b^2}(\sigma^2+\delta^2)}$$

In the second example the difficulty is to realize a transfer function containing a pole-pair $\omega_b(-\sigma\pm j\delta)$ and a conjugated pair of zeros $\omega_b(-n_2\pm jn_3)$ in the complex $(s+\omega^2_o/s)$-plane. After translating the poles and a distance $\omega_o/Q_o$, the transfer function is expressed in $\gamma$, where $\gamma$ is normalized with respect to $\omega_b$, as;

$$H\sim\frac{\gamma^2-2\frac{Q_b}{Q_o}\left(1-n_2\frac{Q_o}{Q_b}\right)\gamma+\frac{Q^2_b}{Q^2_o}\left[1-2n_2\frac{Q_o}{Q_b}+\frac{Q^2_o}{Q^2_b}\left(n^2_2 n^2_3\right)\right]}{\gamma^2-2\frac{Q_b}{Q_o}\left(1-\sigma\frac{Q_o}{Q_b}\right)\gamma+\frac{Q^2_o}{Q^2_o}\left[1-2\sigma\frac{Q_o}{Q_b}+\frac{Q^2_o}{Q^2_b}(\sigma^2+\delta^2)\right]}$$

Figure 16:
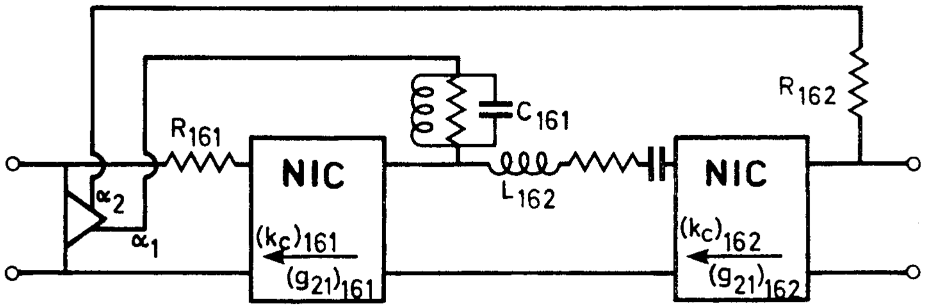
FIG. 16 is a schematic circuit of a band-selection filter, in accordance with the invention, whose transfer function contains a complex conjugate pair of zeros.

Such a transfer function can be realized for example if the filter circuit shown in FIG. 7 is modified so that voltage sources proportioned to the input voltage $E_1$ of the filter circuit are connected in series with the two shunt-elements. This is obtained if there is connected in parallel with the input an amplifier which has an infinite input impedance and zero output-impedance and whose output feeds a voltage divider so that the voltages $\alpha_1 E_1$ and $\alpha_2 E_1$ are obtained which can be connected to the shunt elements as in FIG. 16. The transfer function for the filter circuit of FIG. 16 can be written;

$$H\sim\frac{\gamma^2-\left[A\frac{\alpha_1}{\alpha_2}\frac{1}{(g_{21})_{162}}+B\right]\gamma+\frac{A\cdot B}{\alpha_2(g_{21})_{161}(g_{21})_{162}}+D}{\gamma^2-[A+B]\gamma+A\cdot B+D}$$

For the filter circuit the coefficients have the following values;

$$\frac{(k_c)_{161}}{\omega_b R_{161} C_{161}}=\frac{Q_b}{Q_o}\left(1-\sigma\frac{Q_o}{Q_b}=A\right.$$

$$(k_c)_{162}\frac{R_{162}}{\omega_b L_{162}}=\frac{Q_b}{Q_o}\left(1-\sigma\frac{Q_o}{Q_b}\right)=B$$

$$\frac{1}{\omega^2_b L_{162} C_{161}}=\delta^2=D$$

$$C=0$$

and for the two zeros;

$$\frac{\alpha_1}{\alpha_2}\frac{1}{(g_{21})_{162}}=\frac{1-2n_2\frac{Q_o}{Q_b}+\sigma\frac{Q_o}{Q_b}}{1-\sigma\frac{Q_o}{Q_b}}$$

$$\frac{1}{\alpha_2(g_{21})_{161}(g_{21})_{162}}=\frac{1-2n_2\frac{Q_o}{Q_b}+\frac{Q^2_o}{Q^2_b}(n^2_2+n^2_3-\delta^2)}{\left(1-\sigma\frac{Q_o}{Q_b}\right)^2}$$

In the previous descriptions of filter circuits constructed according to the invention two unnecessary assumptions have been made which make the description clearer. The assumptions can be made more general without affecting the significant features of the inventions.

The first assumption made was that all the resonant circuits with the resonant frequency $f_o$ which are contained in the filter circuits had the same Q-value, $Q_o$, so that the term $\gamma$, in which the transfer function of the filter circuit is expressed had the simple form $$\gamma=s+\frac{\omega^2_0}{s}+\frac{\omega_o}{Q_o}$$

If the resonant circuits are permitted to have different Q-values, the impedance $Z_k$ for series resonant circuits can be written;

$$Z_k=\left(s+\frac{\omega_0^2}{s}+\frac{\omega_0}{Q_{ks}}\right)L_k$$

and the admittance $Y_k$ for parallel resonant circuits can be written as;

$$Y_k=\left(s+\frac{\omega_0^2}{s}+\frac{\omega_0}{Q_{kp}}\right)C_k$$

then the term $\gamma$ is given by the following;

$$\gamma=s+\frac{\omega_0^2}{s}\frac{\omega_0}{Q_m}$$

with $1/Q_m$ being a mean value formed by the terms $1/Q_{ks}$ and $1/Q_{kp}$.

With this choice of $\gamma$, the transfer function for all filter circuits constructed according to the invention will have the characteristic form;

$$H \sim \frac{1}{\gamma^2-(A+B-C)\gamma+(A\cdot B+D)}$$

where the coefficients $A$, $B$, $C$ and $D$ have the same significance as previously.

An example of relaxing this restriction is shown by modifying the filter circuit given in FIG. 7, so that the shunt-element $C_{71}$ has the Q-value $Q_2$. With $1/Q_m=\frac{1}{2}(1/Q_1+1/Q_2)$ and the filter circuit parameters adjusted so that the transfer function contains one pole-pair $\omega_b(-\sigma\pm j\delta)$ in the $(s+\omega_o^2/s)$-plane, the filter circuit coefficients of FIG. 7, are the following;

$$(k_c)_{71}\frac{1}{\omega_b R_{71} C_{71}}=\frac{Q_b}{Q_m}\left(1-\sigma\frac{Q_m}{Q_b}\right)=A$$

$$(k_c)_{72}\frac{R_{72}}{\omega_b L_{72}}=\frac{Q_b}{Q_m}\left(1-\sigma\frac{Q_m}{Q_b}\right)=B$$

$$\frac{1}{\omega_b^2 L_{72} C_{71}}=\left[\frac{1}{2}Q_b\left(\frac{1}{Q_1}-\frac{1}{Q_2}\right)\right]^2+\delta^2$$

$$C=0$$

$$D=\delta^2$$

The second assumption made was that all of the resonant circuits in the filter circuit are series or parallel circuits containing one inductance and one capacitance, so that $\gamma$ contains a term $(s+\omega_o^2/s)$. The filter circuits can of course be constructed from lossy resonant circuits of various kinds, such as open and short circuited lines which have a length of one-quarter of a wave length at the desired resonant frequency $f_o$. For this general case it is required only that the reactance $X_k$ of the series resonant circuits and the susceptance $B_k$ of the parallel resonant circuits become zero at the frequency $f_o$. Then the circuits can be described approximately with the help of their derivatives and the frequency deviation from the resonance frequency, that is $(\Delta s)=j(\omega-\omega_o)$. The impedance $Z_k$ for the series resonant circuits can be written in terms of the derivative of the reactance and the frequency deviation as;

$$Z_k \approx \frac{1}{2}\frac{dx_k}{d\omega}\left[2(\Delta s)+\frac{\omega_0}{Q_{ks}}\right]$$

and the admittance $Y_k$ for parallel resonant circuits can be written in terms of the derivative of the susceptance and the frequency deviation as;

$$Y_k \approx \frac{1}{2}\frac{dB_k}{d\omega}\left[2(\Delta s)+\frac{\omega_0}{Q_{kp}}\right]$$

The desired transfer function of the filter circuit can then be expressed through a pole-pair in a $[2(\Delta s)]$-plane, and the term $\gamma$ will have the form;

$$\gamma=2(\Delta s)+\frac{\omega_0}{Q_m}$$

One significance for filter circuits constructed according to the invention is that the denominator of the transfer function is composed of a second order polynomial expressed in frequency functions of the band-pass character, that is a fourth order polynomial expressed in the complex angular frequency $s$. An analysis of the stability for active filter circuits constructed in a conventional way shows that the circuit will be more stable when the denominator polynomial of the transfer function is of the second order in $s$, and that the circuit will be less stable when the denominator is a fourth order polynomial in $s$. However, this limitation is not true for filter circuits constructed according to the invention where a stability which is better than is possible for filter circuits with a second order polynomial in $s$ in the denominator of the transfer function is obtained by the use of two active elements which are arranged to give the relationship between passive and active elements defined previously by the nearly equal coefficients $A$ and $B$. Furthermore filter circuits constructed according to the invention reduce the number of isolated stages by one-half.

Figure 17:
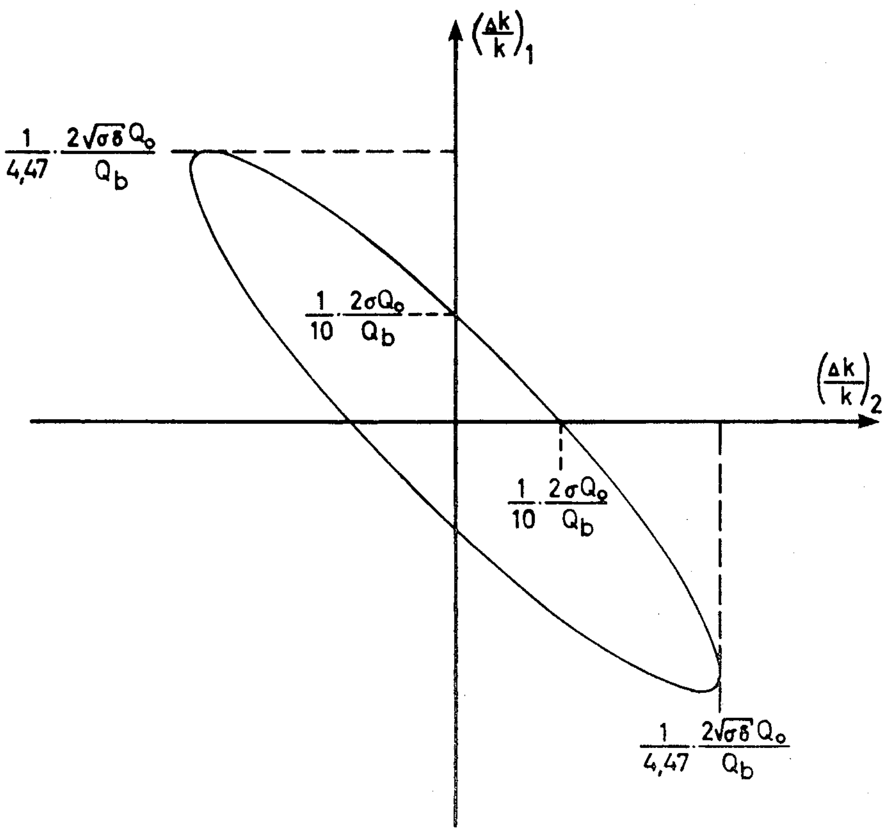
FIG. 17 is a diagram over relative changes, giving a constant pole displacement, in the two active elements of a band-selection filter in accordance with the invention.

Further it is important to know how the transfer function is influenced by changes in the active elements caused by changes in the environment such as voltage and temperature variations. In the previous examples similar active elements have been used and their interconnection has been dictated by the stability for open and short-circuited circuits. Consequently, the two active elements influence the coefficients $A$ and $B$ in a similar way. When two similar active elements are experiencing mutual variations in the environment, similar and simultaneous changes will occur in the active elements. FIG. 17 illustrates the simultaneous relative change in these active elements which is needed to move the poles 1/10 $\sigma$. From FIG. 17 it can be concluded that the stability is better if the simultaneous changes in the two active elements are reversed. This can be obtained when two similar active elements are connected in such a way that the coefficient $A$ is determined by a circuit parameter or expression containing the circuit parameter associated with one of the two active elements while the coefficient $B$ is determined by the inverted value of the corresponding circuit parameter or corresponding expression containing the circuit parameter associated with the other of the two active elements. However, this assumes two similar active elements whose stability against open and short-circuited circuits is different. From FIG. 17 it can be concluded that the identical relative change in the two active elements, necessary for moving the poles 1/10 $\sigma$ under the given assumptions, is;

$$\frac{1}{4\cdot 47}\cdot\frac{2\sqrt{\sigma\cdot\delta Q_0}}{Q_b}$$

The same increase of stability can be obtained with the help of two active elements where the temperature and voltage coefficients for the corresponding circuit parameters are chosen so that they compensate each other.

The following are examples illustrating how two similar active elements can be connected to give this increase of stability.

Figure 18:
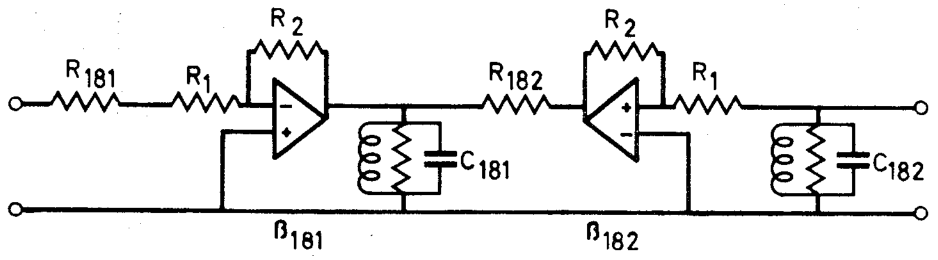
FIG. 18 is a schematic circuit of band selection filter containing two feedback operational amplifiers in accordance with the invention.
Figure 19:
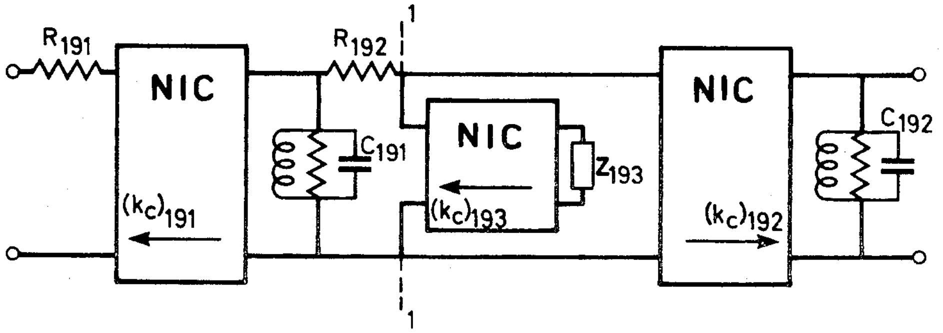
FIG. 19 is a schematic circuit of a band-selection filter containing two negative impedance converters and a third stabilizing negative impedance converter in accordance with the invention.

The first example uses voltage controlled voltage sources which are constructed from operational amplifiers with inverting and noninverting inputs and where internal feedback is obtained by two resistors, $R_1$ and $R_2$. This internal feedback is used to give frequency independent voltage gain at low frequencies. With the internal feedback connected to the inverting input, the additional external feedback between output and input will be stable against open circuits, while with the internal feedback connected to the noninverting input, the additional external feedback between output and input will be stable against short circuited circuits. This construction gives the desired similar active elements which differ only concerning stability against open- and short-circuited circuits. The filter circuit which is a modification of that shown in FIG. 8 is shown in FIG. 18. The components are given by;

$$\frac{1}{\beta_{181}-1}\,\frac{1}{\omega_b R_{181} C_{181}}=A;$$

$$(\beta_{182}-1)\frac{1}{\omega_b R_{182} C_{182}}=B;$$

$$\frac{1}{\omega_b R_{182} C_{181}}=C$$

$$\beta_{181}=\beta_{182}=\frac{R_1+R_2}{R_2}$$

Using this construction, variations in the two active circuit parameters caused by changes in the feedback network because of environmental variation will compensate each other.

The second example uses a third active element to reverse the stability against open- and short-circuited circuits for one of the two similar active elements. The filter circuit which is modified from the one illustrated in FIG. 4, is shown in FIG.

19. Stability requires that the negative admittance which is converted by the active element $(k_c)_{192}$ and which is connected at 1–1, must have a pole in the right half of the $s$-plane. With the chosen orientation of $(k_c)_{192}$ a zero is obtained. When a high impedance $Z_{193}$ is connected to a third active element $(k_c)_{193}$, this third active element gives a small negative correction admittance so that the total negative admittance connected at 1–1 has a pole in the right half of the $s$-plane. For this circuit the coefficients are;

$$(k_c)_{191}\frac{1}{\omega_b R_{191}C_{191}}=A;\quad \frac{1}{(k_c)_{192}}\,\frac{1}{\omega_b R_{192}C_{192}}=B;$$

$$\frac{1}{\omega_b R_{192}C_{191}}=C$$

With this construction variations in the two active elements $(k_c)_{191}$ and $(k_c)_{192}$ caused by variations in the environment will compensate each other. It is to be understood that the above described arrangements are illustrative of the application of the principles of the invention. Numerous other arrangements may be devised by those skilled in the art without departing from the spirit and scope of the invention.

What I claim is:

1. A band-selection filter circuit with a center frequency $f_o$ and corresponding angular frequency $\omega_o=2\pi f_o$ for realization of a desired transfer function H which contains a conjugate pole-pair in a frequency plane used for the description of the filter circuit comprising a network with at least two types of impedance elements, a first type being a resistor and a second type being lossy resonant circuits, the reactance of said lossy resonant circuits when comprising at least one series resonant circuit and the susceptance of said lossy resonant circuits when comprising at least one parallel resonant circuit being zero at a frequency coinciding with the center frequency $f_o$, and two active elements arranged for compensating the resistive losses of said lossy resonant circuits, said active elements being connected with said impedance elements in such a way that when the transfer function H is expressed in polynomials of $\gamma=S(s,\omega_o)+\omega_o/Q_m$, where $S(s,\omega_o)$ is a function of the angular frequency $\omega_o$ and a complex angular frequency variable $s$ with the dimension of frequency and has the value zero for $s=\pm j\omega_o$ and is proportional to the reactance and the susceptance respectively of said resonant circuits, and where $\omega_o/Q_m$ represents the resistive losses in said lossy resonant circuits and $1/Q_m$ is an average value of the inverted selectivity factors of said lossy resonant circuits, the realization of said conjugate pole-pair is obtained when the denominator of the transfer function H contains a second-order polynomial $\gamma^2-[A+B=C]\cdot\gamma+AB+D$, wherein the coefficient of the linear term in $\gamma$ is determined primarily by the sum of the two coefficients $A$ and $B$ and the constant term is determined primarily by the product of said coefficient $A$ and $B$, the coefficient $A$ being determined by a circuit parameter of one of said two active elements and by the magnitudes of components contained in at least two elements of the said impedance elements, and the coefficient $B$ being determined by a circuit parameter of the other of said two active elements and by the magnitudes of components contained in at least two elements of said impedance elements which are different from the said elements determining the coefficient $A$, the components of said impedance elements and the circuit parameters of said active elements being so chosen that the coefficients $A$ and $B$ are of equal magnitude.

2. A band-selection filter circuit in accordance with claim 1 wherein said two active elements are of the same type and are so connected that the coefficient $A$ is determined by a fraction of a circuit parameter of one of said two active elements and the coefficient $B$ is determined by the same function of the inverted value of the corresponding circuit parameter of the other of said two active elements and further comprising a third active element connected in such a way to one side of one element of said two active elements that for said one element and said third active element the stability against open and short circuits is reversed.

3. A band-selection filter circuit in accordance with claim 1 wherein said two active elements are of the same type and the coefficient $A$ is determined by a given function of the circuit parameter of one of said two active elements and the coefficient $B$ is determined by the same function of the circuit parameter of the other of said two active elements.

4. A band-selection filter circuit in accordance with claim 3 comprising two parallel resonant circuits and two resistors wherein the input of each of said two active elements is individually connected to one of said resistors and the output of each of said two active elements is connected to one of said parallel resonant circuits individually and said two active elements with connected circuits are connected in cascade.

5. A band-selection filter in accordance with claim 3 comprising two parallel resonant circuits and two resistors wherein one side of one element of said two active elements is connected in a shunt branch and the other side is terminated by one of said parallel resonant circuits and that one side of the other of said active elements is connected in a series branch and the other side is terminated by one of said resistors the remaining resistor being connected in a series branch between one of the input terminals of the filter circuit and said shunt branch and the other of said parallel resonant circuits being connected in a shunt branch between the output terminals of the filter circuit.

6. A band-selection filter circuit in accordance with claim 3 comprising three parallel resonant circuits and three resistors wherein one side of one element of said two active elements is connected in a shunt branch and the other side is terminated by one of said resistors, one side of the other of said active elements together with one of said resistors is connected in a series branch and the other side is terminated by one of said parallel resonant circuits, the remaining of said resistors being connected in a series branch between one of the input terminals of the filter circuit and said shunt branch, one of said parallel resonant circuits being connected in shunt with the said shunt branch, and the remaining of said parallel resonant circuits being connected in another shunt branch between the output terminals of the filter circuit.

7. A band-selection filter circuit in accordance with claim 3 comprising one parallel resonant circuit and one series resonant circuit and two resistors wherein the input of one of said two active elements is connected to one of said resistors connected in a series circuit to one of the input terminals of the filter circuit and the output is connected to said parallel resonant circuit connected in a shunt branch and the input of the other active elements is connected to the series resonant circuit connected in a series branch and the output is connected to the other of said resistors connected in a shunt branch between the output terminals of the filter circuit.

8. A band-selection filter circuit in accordance with claim 1 wherein said two active elements are of a similar type, have opposite stability against open and short circuits, and are connected in such a way that the coefficient $A$ is determined by a given function of a circuit parameter of one of said two active elements and the coefficient $B$ is determined by the same function of the inverted value of the corresponding circuit parameter of the other of said two active elements.

9. A band-selection filter circuit in accordance with claim 8 comprising two parallel resonant circuits and two resistors wherein one of said two active elements is connected between one of said resistors connected in a series branch at the input of the filter circuit and one of said parallel resonant circuits connected in a shunt branch, the other active element is connected with inverted input between the other of said resistors, connected in a series branch, and the other of said parallel resonant circuits connected in a shunt branch between the output terminals of the filter circuit.